United States Patent [19]

Van Broekhoven et al.

[11] Patent Number: 5,059,678
[45] Date of Patent: Oct. 22, 1991

[54] POLYMERIZATION OF OLEFIN/CARBON MONOXIDE WITH PALLADIUM SALT, BIDENTATE LIGAND AND CARBOXYLIC ACID ESTER OR ANHYDRIDE

[75] Inventors: Johannes A. M. Van Broekhoven; Pieter A. Gautier; Eit Drent; Wiebren A. Miedema, all of Amsterdam, Netherlands

[73] Assignee: Shell Oil Company, Houston, Tex.

[21] Appl. No.: 588,898

[22] Filed: Sep. 27, 1990

[30] Foreign Application Priority Data

Oct. 26, 1989 [NL] Netherlands ............ 8902655

[51] Int. Cl.$^5$ ............ C08G 67/02
[52] U.S. Cl. ............ 528/392; 502/150
[58] Field of Search ............ 528/392

[56] References Cited

U.S. PATENT DOCUMENTS

| | | | |
|---|---|---|---|
| 3,694,412 | 9/1972 | Nozaki | 528/392 |
| 4,810,774 | 3/1989 | Drent | 528/392 |
| 4,818,810 | 4/1989 | Drent | 528/392 |
| 4,818,811 | 4/1989 | Drent | 528/392 |
| 4,835,250 | 5/1989 | Drent | 528/392 |
| 4,843,144 | 6/1989 | Van Broekhoven | 528/392 |
| 4,868,282 | 9/1989 | Van Broekhoven | 528/392 |
| 4,880,903 | 11/1989 | Van Broekhoven et al. | 528/392 |
| 4,894,435 | 1/1990 | Drent | 528/392 |
| 4,914,184 | 4/1990 | Rosenbrand | 528/392 |
| 4,965,341 | 10/1990 | Van Doorn et al. | 528/392 |

FOREIGN PATENT DOCUMENTS

| | | |
|---|---|---|
| 121965 | 2/1984 | European Pat. Off. . |
| 181014 | 11/1986 | European Pat. Off. . |
| 213671 | 1/1987 | European Pat. Off. . |
| 257663 | 1/1988 | European Pat. Off. . |
| 253416 | 3/1988 | European Pat. Off. . |
| 345847 | 2/1989 | European Pat. Off. . |

*Primary Examiner*—Joseph L. Schofer
*Assistant Examiner*—M. Nagumo

[57] ABSTRACT

An improved process for the production of linear alternating polymers of carbon monoxide and at least one ethylenically unsaturated hydrocarbon comprises contacting the carbon monoxide and ethylenically unsaturated hydrocarbon under polymerization conditions in inert reaction diluent in the presence of a catalyst composition formed from a compound of palladium, a bidentate ligand of phosphorus, sulfur or nitrogen and an alkyl ester or anhydride of a monocarboxylic or dicarboxylic acid.

10 Claims, No Drawings

POLYMERIZATION OF OLEFIN/CARBON MONOXIDE WITH PALLADIUM SALT, BIDENTATE LIGAND AND CARBOXYLIC ACID ESTER OR ANHYDRIDE

FIELD OF THE INVENTION

This invention relates to an improved process for the production of linear alternating polymers of carbon monoxide and at least one ethylenically unsaturated hydrocarbon. More particularly, it relates to such an improved process which employs a catalyst composition comprising a salt of palladium, an alkyl ester or anhydride of a carboxylic acid and a bidentate ligand of phosphorus, nitrogen or sulfur.

BACKGROUND OF THE INVENTION

The class of linear alternating polymers of carbon monoxide and at least one ethylenically unsaturated hydrocarbon is known in the art. An early production of such polymers is disclosed by Nozaki, e.g., U.S. Pat. No. 3,694,412, who employed an arylphosphine complex of palladium moieties as catalyst and certain inert solvents.

More recently, the class of linear alternating polymers of carbon monoxide and at least one ethylenically unsaturated hydrocarbon has become of greater interest in part because of the greater availability of the polymers. These polymers, often referred to as polyketones or polyketone polymers, have been more recently produced by processes disclosed by a number of published European Patent applications including 121,965, 181,014, 213,671, 257,663 and 345,847. The process typically involves the use of a catalyst composition formed from a compound of palladium, cobalt or nickel, the anion of a strong non-hydrohalogenic acid and a bidentate ligand of phosphorus, arsenic, antimony, nitrogen or sulfur. The resulting polymers are relatively high molecular weight materials having established utility as premium thermoplastics in the production of shaped articles such as containers for food and drink by processes which are conventional for thermoplastic polymers.

The production of these polyketone polymers suffers, however, from a problem that is common to the production of many if not most polymeric materials. When practiced on a large or a commercial scale, the production of the linear alternating polymers results in the formation of certain proportions of polymer that is not easily removed from the polymerization reactor and remains adhered to the internal surfaces of the reaction vessel. Methods have been proposed to reduce the degree of this reactor fouling including polishing or coating the internal surfaces of the polymerization reactor prior to polyketone production or the inclusion of particulate material in the polymerization mixture. It would be of advantage, however, to provide an improved process for the production of linear alternating polymers of carbon monoxide and at least one ethylenically unsaturated hydrocarbon which exhibits a reduced or lessened degree of reactor fouling.

SUMMARY OF THE INVENTION

The present invention contemplates an improved process for the production of linear alternating polymers of carbon monoxide and at least one ethylenically unsaturated hydrocarbon. More particularly, it contemplates such an improved process which employs a catalyst composition formed from a salt of palladium, an alkyl ester or anhydride of a carboxylic acid and a bidentate ligand of phosphorus, nitrogen or sulfur. The process of the invention produces the linear alternating polymer at a polymerization rate somewhat faster than the more conventional processes and results in a substantially reduced degree of reactor fouling.

DESCRIPTION OF THE INVENTION

The polymers which are produced according to the improved process of the invention are linear alternating polymers of carbon monoxide and at least one ethylenically unsaturated hydrocarbon. The ethylenically unsaturated hydrocarbons which are useful as precursors of the linear alternating polymers have up to 20 carbon atoms inclusive, preferably up to 10 carbon atoms inclusive, and are aliphatic such as ethylene and other α-olefins including propylene, 1-butylene, isobutylene, 1-hexene, 1-octene and 1-dodecene, or are arylaliphatic containing an aryl substituent on an otherwise aliphatic molecule, particularly an aryl substituent on the carbon atom of the ethylenic unsaturation. Illustrative of this latter class of ethylenically unsaturated hydrocarbons are styrene, p-methylstyrene, p-ethylstyrene or m-isopropylstyrene. The preferred polyketone polymers are copolymers of carbon monoxide and ethylene or terpolymers of carbon monoxide, ethylene and a second α-olefin of at least 3 carbon atoms, particularly an α-olefin such as propylene.

When the preferred terpolymers are produced by the process of the invention, there will be at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

 (I)

wherein G is the moiety of the second hydrocarbon of at least 3 carbon atoms polymerized through the ethylenic unsaturation thereof, and the ratio of y:x is no more than about 0.5. When copolymers of carbon monoxide and ethylene are produced according to the process of the invention there will be no second hydrocarbon present and the copolymers are represented by the above formula I wherein y is zero. When y is other than zero, i.e., terpolymers are produced, the

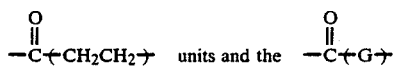

units occur randomly throughout the polymer and ratios of y:x from about 0.01 to about 0.1 are preferred. The end groups or "caps" of the polymer chain will depend on what materials were present during the production of the polymer and how or whether the polymer has been purified. However, the end groups are of little significance so far as the overall properties of the polymer are concerned so that the polymer is fairly represented by the polymer chain as depicted above.

Of particular interest are the polyketone polymers of the above formula I having a number average molecular weight from about 1000 to about 200,000, particularly those of number average from about 20,000 to about 90,000, as determined by gel permeation chromatography. The physical properties of such polymers will be determined in part by the molecular weight, whether the polymer is a copolymer or a terpolymer and, in the case of terpolymers, the nature of the proportion of the second hydrocarbon present. Typical melting points for such polymers are from about 175° C. to about 300° C., more often from about 210° C. to about 270° C. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polymers are produced by the general synthesis procedures of the above published European Patent Applications hut employ a particular catalyst composition. As a result of the use of such catalyst composition, the process results in a relatively low degree of the reactor fouling normally associated with the production of most polymeric materials. In addition, the process demonstrates a relatively high productivity as determined by the amount of polymer product obtained per gram of palladium per unit time.

The catalyst composition of the invention is formed from a compound of palladium, an alkyl ester or anhydride of a carboxylic acid and a bidentate ligand of phosphorus, nitrogen or sulfur. The compound of palladium is a palladium salt and preferably is a palladium alkanoate such as palladium acetate, palladium propionate, palladium butyrate or palladium octanoate. Palladium acetate is particularly preferred.

The alkyl ester or anhydride employed as a precursor of the catalyst composition is an alkyl ester, wherein each alkyl group has up to 4 carbon atoms inclusive, or an anhydride of a monocarboxylic or dicarboxylic acid. Preferably, the alkyl ester or anhydride is derived from a carboxylic acid having a pKa, measured in water at 18° C., below 2. Particularly preferred are alkyl esters or anhydrides of halogen- and particularly fluorine-substituted carboxylic acids. Illustrative of such esters and anhydrides are methyl trifluoroacetate, ethyl trichloroacetate, methyl pentafluoropropionate, diethyl tetrafluorosuccinate, octafluoroadipic acid anhydride, ethyl heptafluorobutyric acid, hexafluoroglutaric acid anhydride and methyl difluoroacetate. In general, the alkyl esters are preferred over the acid anhydrides and especially preferred is methyl trifluoroacetate. It is known, for example, from the above published European Patent Applications to incorporate an acidic species in the catalyst composition solution, e.g., the free acid, a metal salt of an acid or even a palladium salt of the acid. In European Patent Application 253,416 a metal salt is used as the source of the acidic species in conjunction with an ester as catalyst activity promoter. In the present invention the provision of the alkyl ester or anhydride as the sole source of the acidic species is considered to be responsible for the advantages obtained through the use of the catalyst composition of the invention. The alkyl ester or anhydride is provided to the catalyst composition solution in a quantity of from about 1 mol to about 100 mols per mol of palladium. Preferred quantities of alkyl ester or anhydride are from about 2 mols to about 50 mols per mol of palladium.

The catalyst composition of the invention is also formed from a bidentate ligand of sulfur, nitrogen or phosphorus. When the bidentate ligand utilized is a bidentate ligand of sulfur, the ligand is suitably a ligand represented by the formula

wherein R' independently is aliphatic or aromatic of up to 10 carbon atoms inclusive and R is a divalent hydrocarbon bridging group of up to 10 carbon atoms inclusive with from 2 to 4 carbon atoms in the bridge, preferably 1,2-ethylene or 1,3-propylene. R' is suitably hydrocarbon containing only atoms of carbon and hydrogen or R' is substituted hydrocarbon containing additional atoms such as halogen or divalent oxygen. Hydrocarbon R' groups are preferred over corresponding substituted hydrocarbon groups and, in general, aliphatic R' groups are preferred over aromatic groups. Illustrative of suitable bidentate ligands of sulfur are 1,2-di(ethylthio)ethane, 1,2-di(benzylthio)ethane and 1,3-di(phenylthio)propane.

When the bidentate ligand to be used in the formation of catalyst composition is a bidentate ligand of nitrogen, the preferred bidentate nitrogen ligands are of the general formula

wherein X independently represents a divalent connecting group of up to 10 atoms with from 2 to 4 atoms in the bridge, at least two of which are carbon atoms with any remaining bridge atoms being nitrogen atoms. Illustrative of such bidentate nitrogen ligands are 2,2'-bipyridine and 1,10-phenanthroline.

When the bidentate ligand is a bidentate ligand of phosphorus, the ligand is suitably represented by the general formula

wherein R and R' have the previously stated meanings. In the case of bidentate phosphorus ligands the R' groups are preferably aromatic and particularly preferred are R' groups which are phenyl and contain a polar substituent, e.g., alkoxy, at a ring carbon atom substituent ortho to the carbon atom through which the R' is attached to phosphorus. Illustrative of such bidentate phosphorus ligands are 1,3-bis(diphenylphosphino)propane and 1,3-bis[di(2-methoxyphenyl)phosphino]propane.

If the bidentate ligand to be employed is a ligand of nitrogen or sulfur, it is provided to the catalyst composition solution in a quantity of from about 0.5 mol to about 100 mls per mol of palladium. Preferred quantities are from about 1 mol to about 50 mols per mol of palladium. When a bidentate ligand of phosphorus is utilized, the ligand is provided in a quantity from about 0.5 to about 2 mols per mol of palladium, preferably from about 0.75 mol to about 1.5 mol per mol of palladium.

It is useful, on occasion, to promote the activity of the catalyst composition of the invention by the additional presence of an organic oxidant, particularly a 1,4 quinone. Particularly useful are 1,4-benzoquinone and 1,4-naphthoquinone although 1,4-benzoquinone is preferred. As stated, no quinone is necessary and amounts of 1,4 quinone up to about 5000 mols per mol of palladium are satisfactory. When quinone is present, amounts from about 10 mols to about 1000 mols per mol of palladium are preferred.

The polymerization process is conducted by contacting the carbon monoxide and ethylenically unsaturated hydrocarbon under polymerization conditions in the presence of the catalyst composition and an inert diluent. The molar ratio of total ethylenically unsaturated hydrocarbon to carbon dioxide is from about 10:1 to about 1:5, and preferably from about 5:1 to about 1:2. Sufficient catalyst composition is employed to provide from about $1 \times 10^{-7}$ mol to about $1 \times 10^{-3}$ mol of palladium per mol of ethylenically unsaturated hydrocarbon, preferably from about $1 \times 10^{-6}$ mol to about $1 \times 10^{-4}$ mol of palladium per mole of ethylenically unsaturated hydrocarbon. The reaction diluent to be employed is a diluent in which the polymer products are at least substantially insoluble. Alkanol diluents such as methanol or ethanol are satisfactory and methanol is preferred.

The monomeric reactants and the catalyst composition are contacted under polymerization conditions in a suitable reactor. Typical polymerization conditions include a temperature from about 40° C. to about 120° C. although polymerization temperatures from about 50° C. to about 100° C. are preferred. The reaction pressure is generally from about 20 bar to about 150 bar with pressures from about 30 bar to about 100 bar being more commonly utilized. Reactant and catalyst contact is facilitated by conventional procedures such as shaking or stirring and subsequent to polymerization the reaction is terminated as by cooling the product mixture and releasing the pressure. The polymer product is obtained as a material substantially insoluble in the reaction diluent and is recovered by well known methods such as filtration or decantation. The polymer product is useful as obtained or it can be purified as by contact with a solvent or complexing agent selective for catalyst composition residues.

The process of the invention is characterized by the relatively high productivity of the catalyst composition and the relatively low degree of reactor fouling as determined by a relatively low proportion of polymer product which adheres to the internal surfaces of the reactor and is not removed from the reactor as a slurry of the polymer product in the reaction diluent. The polyketone polymer product that remains adhered to the internal surfaces of the reactor can be recovered by mechanical methods but the lessened degree of reactor fouling obtainable through the use of the improved process of the present invention provides a substantial economic benefit.

The polymer product is thermoplastic and enjoys the applications conventional for such thermoplastic polymers. The polyketone polymers are processed by conventional methods such as injection molding, extrusion and thermoforming into a variety of shaped articles of established utility. Specific applications include containers for food and drink and parts and housings in the automotive industry.

The invention is further illustrated by the following Comparative Examples (not of the invention) and the Illustrative Embodiments which should not be construed as limiting. In the Comparative Examples and Illustrative Embodiments, all copolymers of carbon monoxide and ethylene were linear and alternating and terpolymers of carbon monoxide, ethylene and propylene were linear and contained moieties from carbon monoxide alternating with moieties from ethylene or propylene, which occurred in a substantially random order.

COMPARATIVE EXAMPLE I

A carbon monoxide/ethylene/propylene terpolymer was produced by charging 1.5 liters of methanol to a 4 liter autoclave equipped with a mechanical stirrer. The air in the autoclave was removed by pressurizing the autoclave with carbon monoxide to 50 bar and then releasing the pressure three separate times. The autoclave and contents were then heated to 80° C. and carbon monoxide was introduced to give a pressure of 20 bar. This was followed by addition of sufficient propylene to give a total pressure of 27.5 bar and then sufficient ethylene to give a total pressure of 42.5 bar. A catalyst composition solution was then introduced which comprised 10 ml acetone, 0.016 mmol palladium acetate, 0.32 mmol trifluoroacetic acid and 0.017 mmol of 1,3-bis[di(2-methoxyphenyl)phosphino]propane. The pressure in the autoclave was maintained by addition of an equimolar mixture of carbon monoxide and ethylene. After 12 hours, the polymerization was terminated by cooling the reactor and contents to room temperature and releasing the pressure.

The contents of the autoclave comprised a suspension containing 16 g of terpolymer and 29 g of terpolymer which remained adhered to internal surfaces of the autoclave. The reactor fouling was therefore calculated to be 29/16+29 times 100 or 64%. The polymerization rate was calculated to be 2.2 kg of terpolymer/g Pd hr.

ILLUSTRATIVE EMBODIMENT I

A terpolymer of carbon monoxide, ethylene and propylene was produced by a procedure substantially similar to that of Comparative Example I except that the catalyst composition solution comprised 10 ml of acetone, 0.02 mmol palladium acetate, 0.4 mmol methyl trifluoroacetate and 0.021 mmol 1,3-bis[di(2-methoxyphenyl)phosphino]propane and the reaction time was 17.5 hours instead of 12 hours.

A polymer suspension containing 105.5 g of terpolymer was obtained and the reactor fouling was less than 0.1%. The polymerization rate was 2.8 kg of terpolymer/g Pd hr.

COMPARATIVE EXAMPLE II

A copolymer of carbon monoxide and ethylene was prepared by a procedure substantially similar to that of Comparative Example 1 except that
a) the reactor was pressurized with carbon monoxide to 27 bar and ethylene was then added to give a total pressure of 58 bar (no propylene was added),
b) the catalyst composition solution comprised 10 ml acetone, 0.02 mmol palladium acetate, 0.4 mmol trifluoroacetic acid and 0.021 mmol 1,3-bis[di(2-methoxyphenyl)phosphino]propane, and
c) the reaction time was 21 hours instead of 12 hours.

A polymer suspension containing 46 g of copolymer was obtained and 146 g of copolymer remained in the reactor. The reactor fouling was calculated to be 76% and the polymerization rate was calculated to be 4.3 kg of copolymer/g Pd hr.

ILLUSTRATIVE EMBODIMENT II

A carbon monoxide/ethylene copolymer was produced by a procedure substantially similar to that of Comparative Example II except that the catalyst composition solution contained 0.4 mmol of methyl trifluoroacetate instead of trifluoroacetic acid and the reaction time was 4.7 hours instead of 21 hours.

A polymer suspension containing 110 g of copolymer was obtained and the reactor fouling was less than 0.1%. The polymerization rate was 11 kg of copolymer/g Pd hr.

COMPARATIVE EXAMPLE III

A terpolymer of carbon monoxide, ethylene and propylene was produced by a procedure substantially similar to that of Comparative Example I except that
  a) the autoclave had a capacity of 1.5 liters and contained 500 ml of methanol,
  b) the reactor was pressurized to 20 bar with carbon monoxide and then to a total of 34 bar with propylene and a total of 56 bar with ethylene,
  c) the catalyst composition solution comprised 10 ml of acetone, 0.01 mmol palladium acetate, 0.2 mmol trifluoroacetic acid, and 0.011 mmol 1,3-bis[di(23-methoxyphenyl)phosphino]propane, and
  d) the reaction time was 5.7 hours instead of 12 hours.

A polymer suspension containing 2.4 g of terpolymer was obtained and 16 g of terpolymer remained in the reactor. The reactor fouling was calculated to be 87% and the rate of reaction was calculated to be 3.1 kg of terpolymer/g Pd hr.

ILLUSTRATIVE EMBODIMENT III

A terpolymer of carbon monoxide, ethylene and propylene was produced by a procedure substantially similar to that of Comparative Example III except that the catalyst composition solution comprised 0.2 mmol of methyl trifluoroacetate instead of trifluoroacetic acid, and the reaction time was 3.2 hours instead of 5.7 hours.

A polymer suspension containing 14.6 g of terpolymer was obtained and 0.3 g of terpolymer remained in the reactor. The reactor fouling was therefore calculated to be 2%. The polymerization rate was 4.4 kg of terpolymer/g Pd hr.

I claim:

1. In the process of producing linear alternating polymers of carbon monoxide and at least one ethylenically unsaturated hydrocarbon by contact of the carbon monoxide and hydrocarbon under polymerization conditions in the presence of a reaction diluent and a catalyst composition formed from a palladium salt, a bidentate ligand of phosphorus, nitrogen or sulfur, and a source of ions, the improvement wherein the sole source of ions is an alkyl ester or anhydride of a monocarboxylic acid or a dicarboxylic acid.

2. The process of claim 1 wherein the carboxylic acid has a pKa below 2.

3. The process of claim 2 wherein the acid is a halogen-substituted carboxylic acid.

4. The process of claim 2 wherein the carboxylic acid is a fluorine-substituted acid.

5. The process of claim 4 wherein the source of ions is an alkyl ester wherein the alkyl has up to 4 carbon atoms.

6. The process of claim 5 wherein the alkyl is methyl.

7. The process of claim 6 wherein the source of ions is methyl trifluoracetate.

8. In the process of producing linear alternating terpolymers of carbon monoxide, ethylene and propylene by contacting the carbon monoxide, ethylene and propylene under polymerization conditions in the presence of a reaction diluent and a catalyst composition formed from a compound of palladium, a bidentate ligand of phosphorus and a source of ions, the improvement wherein the sole source of ions is an alkyl ester of a halogenated carboxylic acid, wherein the alkyl moiety has up to 4 carbon atoms inclusive.

9. The process of claim 8 wherein the alkyl is methyl.

10. The process of claim 8 wherein the halogenated carboxylic acid is trifluoroacetic acid.

* * * * *